United States Patent
Strobel et al.

[11] 3,815,430
[45] June 11, 1974

[54] A REVERSIBLE, FRICTIONAL DRIVE ASSEMBLY

[75] Inventors: Roland Strobel; Peter Frerichs, Wilhelmshaven, both of Germany

[73] Assignee: Olympia Werke AG, Wilhelmshaven, Germany

[22] Filed: June 4, 1973

[21] Appl. No.: 366,261

[30] Foreign Application Priority Data
June 30, 1972 Germany.......................... 2232149

[52] U.S. Cl....................... 74/203, 74/206, 74/210
[51] Int. Cl............................................ F16h 17/00
[58] Field of Search ............ 74/202, 203, 206, 209, 74/210; 274/4 D, 4 J, 17

[56] References Cited
UNITED STATES PATENTS

| | | | |
|---|---|---|---|
| 2,698,183 | 12/1954 | Lang..................... | 74/210 |
| 2,838,959 | 6/1958 | Schuyler................ | 74/203 |
| 2,911,849 | 11/1959 | Mitchell et al......... | 74/203 |
| 3,188,867 | 6/1965 | Mitchell et al......... | 74/203 |
| 3,451,281 | 6/1969 | Matsuda................ | 74/210 |

*Primary Examiner*—Samuel Scott
*Assistant Examiner*—Allan Russell Burke
*Attorney, Agent, or Firm*—Spencer & Kaye

[57] ABSTRACT

A gear driving assembly for selectively driving a wheel in the forward and reverse directions, including a forward stepped friction gear and a reverse stepped friction gear each disposed on its own support member, which is pivotable about a respective bearing point, and control apparatus operatively associated with the support members to selectively cause each of the friction gears to be separately pivoted into engagement with the wheel. The bearing points are arranged such that the friction gears can be pivoted into engagement with each other. A spring is connected between the support members to urge the friction gears out of engagement with each other. When the wheel is to be driven in the forward direction, however, the control apparatus provides a sufficient force to overcome the force of the spring and cause the friction gears to be pivoted into engagement. This arrangement of the friction gears, the respective support members and the spring forms a closed chain of links when the wheel is to be driven in the forward direction and an open chain when the wheel is to be driven in the reverse direction or is in a stop position.

7 Claims, 4 Drawing Figures

PATENTED JUN 11 1974

A REVERSIBLE, FRICTIONAL DRIVE ASSEMBLY

BACKGROUND OF THE INVENTION

The present invention involves a gear driving assembly for selectively driving a wheel in the forward and reverse directions.

This type of driving assembly generally includes a plurality of stepped friction gears which are disposed on pivotal support members in the instrument housing. Each of these friction gears consists of a plurality of coaxially arranged driving wheels. One of the friction gears is operatively coupled to a motor which provides the power for driving the wheel. These friction gears are selectively brought into contact with the wheel which is to be driven. The support members are interconnected via a spring so that they are operatively associated with each other.

This type of driving assembly is often utilized in driving the turntable of a dictating machine.

Such a drive assembly is capable of selectively switching the turntable of the dictating machine, which holds the planar record carrier, between a stopped position, a forward position for recording or playing back recorded information and a reverse position, in which the wheel is rapidly driven in a reverse direction for locating a certain place in the recording.

The motor in such a driving assembly drives a reverse friction gear via a flat rubber belt connected to one of the wheels of the gear. This reverse friction gear also includes a rubber coated wheel with a diameter smaller than that of the wheel coupled to the belt. One wheel of the forward gear is pressed into continuous engagement with this rubber coated wheel of the reverse friction gear by the force of a tension spring. The forward friction gear also has a further smaller-diameter wheel which can be brought into engagement with the turntable. Both stepped gears are attached to movable levers which are attached to the instrument housing with a common fulcrum point. When a pivoting movement of one of the stepped gears is actuated by a magnet, the respective gear is placed against the contact surface at the outer periphery of the turntable, with the second stepped gear pivoting along with the first via the tension springs. Due to the transmission ratio between the gears, rotation of the turntable in the reverse direction is much faster than the rotation in the forward direction. Since when the turntable is to be in the stop position there is no current in the magnets, the previously switched stepped gear is moved away from the friction surface of the turntable.

Since in such an arrangement the wheels of the stepped gears are always mutually engaged in a force-transmitting relationship even during the stop position of the gears, the formation of recesses in both friction coatings as well as bulging of the rubber behind the points of contact is unavoidable. These changes in the shape of the wheel have an adverse effect on the starting and synchronous movement of the turntable which is to be driven.

SUMMARY OF THE INVENTION

An object of the present invention is to provide a gear driving assembly in which the stepped friction gears are not engaged during the stop position and during movement in the reverse direction.

This objective is accomplished according to the present invention in that a spring is connected between the support members on which the forward and reverse friction gears are disposed for providing a force causing the friction gears to be disengaged except when the wheel, for example the turntable, is to be driven in a forward direction. Each of the support members is pivotable about a respective bearing point. The bearing points of the support members are arranged in such a spaced relationship that the friction gears, the associated support members and the spring form a closed chain of links when the wheel is to be driven in a forward direction and form an open chain of links when the wheel is to be driven in a reverse direction or when the wheel is in a stop position.

The advantages obtained with the driving assembly of the present invention are primarily due to the fact that the forward friction gear is only placed into operative engagement with the motor-driven reverse friction gear when necessary and furthermore that these friction gears come into engagement, thus causing the forward gear to rotate, before the forward gear is pivoted into engagement with the turntable in a force-transmitting contact. The force which is exerted by the spring clamped between the supports causing the chain of links to open can be relatively small so that it will not cause any annoying influences on the control apparatus for selectively moving the friction gears into engagement with the wheel.

The control apparatus, for selectively moving the friction gears into their operating positions in which they are pressed against the wheel to be driven, for example the turntable, includes two electromagnetic relay switches each of which is operatively coupled with one of the support members via a spring clamped between the respective switch and the respective support member.

DESCRIPTION OF THE PREFERRED EMBODIMENTS

Figure 1:
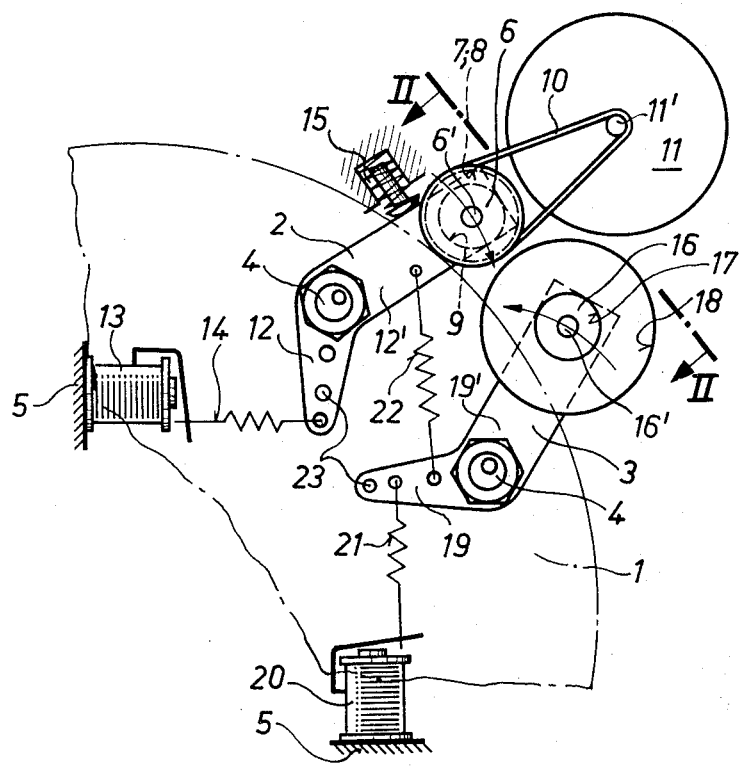
FIG. 1 is a plan view of a gear driving assembly according to the present invention in which the friction gears are in their stop position.

In the gear driving assembly as shown in FIG. 1, the wheel 1 to be driven, which may be, for example, the turntable of a dictating machine, is only illustrated in order to provide a clearer understanding of the operative relationship between the various components of the assembly, which are arranged below the wheel. Both the reverse gear support 2 and the forward gear support 3, shown in FIG. 1 as levers, are each pivotal about a respective bearing point located in an eccentric 4 in the instrument housing 5. Each of the supports 2 and 3 consists of two arms 12, 12' and 19, 19', respectively, which arms are joined at the respective bearing points. These bearing points are arranged in spaced relationship to each other, with the space between them being adjustable.

A stepped friction gear 6 is mounted on a shaft 6' which is attached to the arm 12' of the reverse gear support 2. The stepped friction gear 6 has two gears, or wheels, 7 and 8, which are of the same size and a smaller gear 9, with all three of these gears, 7, 8 and 9 being coaxially arranged on the shaft 6'.

Gear 7 is connected with the drive shaft 11' of a motor 11 via a belt 10. This motor is arranged within the housing so that the center of shaft 11' lies along the extension of a line drawn between the center of the bearing point of the reverse gear support 2 and the center of the shaft 6' of the reverse stepped friction gear 6 when the friction gears are in the stop position, as shown in FIG. 1.

A tension spring 14 is connected between arm 12 of the reverse gear support 2 and the armature of an electromagnetic relay switch 13. The actuation of the switch 13 causes the reverse friction gear 6 to be pivoted so that gear 8 engages the wheel 1 as will be further described below.

A stepped friction gear 16 is mounted on shaft 16' which is disposed on the forward gear support 3. This stepped friction gear 16 which constitutes the forward friction gear has two gears 17 and 18 of different diameters. A tension spring 21 is connected between the arm 19 of the forward gear support 3 and the armature of an electromagnetic relay switch 20. The actuation of the switch 20 causes the forward friction 16 to be pivoted so that gear 17 engages the wheel 1, as will be further described below.

A further tension spring 22 is disposed between arms 12' and 19 of supports 2 and 3, respectively. Spring 22 exerts a force between the supports 2 and 3 which causes the supports to be pivoted such that the friction gears 6 and 16 are normally disengaged.

For proper operation of the gear driving assembly according to the present invention it is important that the supports 2 and 3 are spaced within the instrument housing 5 and are separately pivotally movable therein. This spacing of the shafts 6' and 16', supporting the stepped friction gears 6 and 16, respectively, from the bearing points of the supports 2 and 3 and the spacing of these shafts 6 and 16' from one another are adjusted such that it is possible to produce either an open or closed chain of links between these members. When the gears are stopped, belt 10 keeps the reverse stepped friction gear 6 out of engagement with wheel 1 and tension spring 22 disposed between supports 2 and 3 keeps the forward stepped friction gear 16 out of engagement with the wheel 1 and the reverse stepped friction gear 6. As a result of the operational position of supports 2 and 3, the friction gears 6 and 16, the supports 2 and 3 and the spring 22 form a closed chain of links during the forward movement and an open chain during the reverse movement or when the mechanism is in the stop position. In accordance with this operation, the forward stepped friction gear 16 is not carried along by the reverse stepped friction gear 6 during the reverse movement of the wheel 1.

Figure 2:
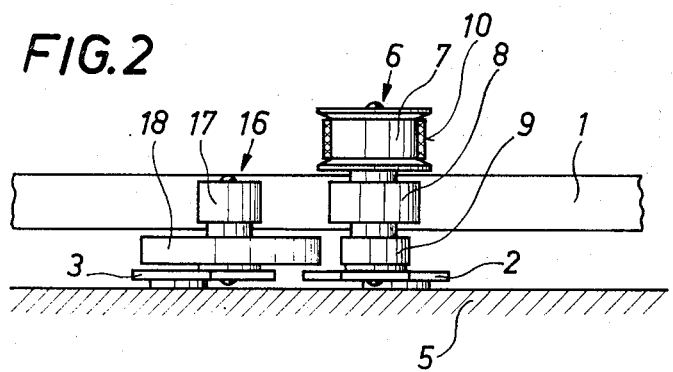
FIG. 2 is a sectional view along the line II—II in FIG. 1.

The relationship between the various gears of the stepped friction gears 6 and 16 can be better visualized from the view in FIG. 2. The reverse stepped friction gear 6 includes gear 7 around which the belt 10 is wrapped, gear 8 which is positioned so as to be able to be pivoted into engagement with the wheel 1 and gear 9 against which gear 18 of the forward stepped friction gear 16 can be pivoted. The forward stepped friction gear 16 includes gear 18 and gear 17 which can be pivoted into engagement with wheel 1. The gears 7 and 18 have a metallic surface, while the other gears are provided with a rubber friction bearing surface. The surface of the driven wheel 1 also may be metallic.

Figure 3:
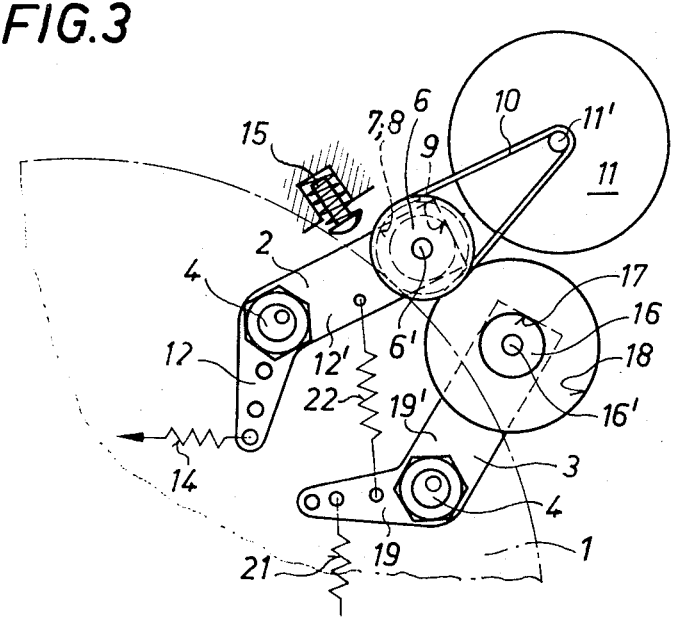
FIG. 3 is a plan view showing the arrangement of FIG. 1 in which the friction gears are in a reverse driving position.

If the armature of the switch 13 is excited, thereby exerting a force on spring 14, as shown by the arrow in FIG. 3, support 2 is pivoted about its fulcrum so that gear 8 of the reverse stepped friction gear 6 is brought into a force-transmitting contact with the wheel 1. Since the reverse friction gear 6 is coupled to the motor 11, gear 8 drives the wheel 1. The transmission of force and thus the transmission of the torque to wheel 1 is effected via the tension spring 14 before the armature has been fully excited. Since there are no pulling forces exerted on the tension springs 21 and 22, the forces of these springs are effectively equalized so that the forward gear support 3 remains in its starting position.

Figure 4:
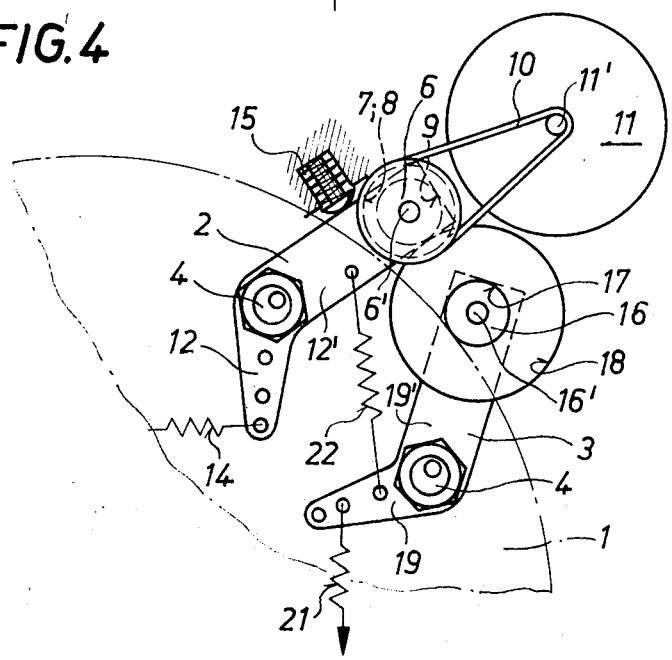
FIG. 4 is a plan view showing the arrangement of FIG. 1 in which the friction gears are in a forward drive position.

When wheel 1 is to be driven in the forward direction, as shown in FIG. 4, switch 13 is turned off and the armature of switch 20 is excited and pulls tension spring 22 causing the forward gear support 3 to be pivoted such that gear 18 of the stepped friction gear 16 is pressed against gear 9 of the stepped friction gear 6. The stepped friction gear 6, which when the armature of switch 13 was deactivated, was pulled from its starting position by belt 10, is pressed, by the movement of gear 18, against the spring action of an abutment 15 until gear 17 of the stepped friction gear 16 engages wheel 1 in a force-transmitting connection. Abutment 15 which is adjustably disposed in the housing 5 provides a resilient force against the movement of the support 3. The effects of tension springs 14 and 22 need not be considered since the resilient abutment 15 as well as the change in length of tension spring 21 which has been effected by the armature position of magnet 20, overcome these forces of the springs 14 and 22 and produce the compression force of the stepped friction gears against one another. The spring abutment 15 is so adjusted that its resilient portion touches the reverse gear support 2 in its stop position as shown in FIG. 1.

The forward switch 20 as well as the reverse switch 13 are so adjusted that with a movement of approximately 0.3 to 0.5 mm between the armature and the magnetic core of the switches it is possible for the respective operating positions of the friction gears to be reached. The eccentrics 4 of the bearing points of supports 2 and 3 can be pivoted so as to enable the location of the bearing point of the supports 2 and 3 to be separately adjustable thereby enabling the spacing between the supports to be adjusted to the proper spacing for the chain of links to be formed during the pivoting movement. Furthermore, springs 14 and 21 may be connected to different bores 23 in the arms 12 and 19 in order to vary the pulling forces and lever moments.

It will be understood that the above description of the present invention is susceptible to various modifications, changes and adaptations, and the same are intended to be comprehended within the meaning and range of equivalents of the appended claims.

We claim:

1. In a gear driving assembly arranged in an instrument housing for selectively driving a wheel in the forward and reverse directions, the assembly comprising a motor, two pivotal support members each pivotally mounted on a respective bearing point and each having two arms joined at the respective bearing point, forward and reverse stepped friction gears each disposed on a rotatable axis on one arm of a respective pivot support member and capable of being pivoted into contact with the wheel to be driven, control means operatively associated with said support members for selectively causing each friction gear to be separately pivoted into contact with the wheel, a drive belt connected between the motor and one of the stepped friction gears, a spring connected between the support members, the improvement wherein: said bearing points are arranged in a spaced relationship such that said friction gears can be selectively pivoted into engagement with each other; said spring is connected between one of said arms of said reverse gear support member and one of said arms of said forward gear support member for providing a force in a direction causing said friction gears to be pivoted away from each other; said control means provides a sufficient force to overcome the force of said spring and cause said friction gears to become engaged with each other when the wheel is to be driven in the forward direction, whereby said friction gears, said respective support member and said spring form a closed chain of links when the wheel is to be driven in a forward direction and form an open chain of links when the wheel is to be driven in a reverse direction and when the wheel is stopped.

2. An arrangement as defined in claim 1 wherein said spring is a tension spring having a first end attached to the other of said arms of said support member associated with said forward friction gear and a second end attached to said one of said arms of said support member associated with said reverse friction gear.

3. An arrangement as defined in claim 1 wherein said control means includes two separately actuatable relay switches, two tension springs each connected between a respective one of said relay switches and the other of said arms of a respective support member, each of said other arms having a bore, the distance between the bore and the respective bearing point being different for each said other arm, each of said springs associated with said relay switches being attached in the bore of a respective other arm.

4. An arrangement as defined in claim 1 wherein said motor has a drive gear around which said belt is arranged and said drive gear having its axis of rotation disposed on a line extending between the center points of said bearing point of said support member associated with said reverse friction gear and of said rotatable axis on which said reverse friction gear is disposed, when said friction gears are in the stop position.

5. An arrangement as defined in claim 1 wherein when the wheel is to be driven in a forward direction said control means causes said reverse gear to be pivoted away from the wheel, and further comprising a resilient abutment adjustably disposed in the instrument housing to operatively engage said support member associated with said reverse friction gear to limit the pivotal movement of said reverse friction gear away from the wheel to be driven.

6. An arrangement as defined in claim 1 further comprising eccentric mounting means, wherein said support members are pivotally mounted at said respective bearing points on said eccentric mounting means permitting the location of each of said bearing points to be separately adjusted.

7. An arrangement as defined in claim 1 wherein the wheel to be driven is a turntable of a dictating machine.

* * * * *